UNITED STATES PATENT OFFICE.

J. CARPENTER WORTH, OF COLERAIN P. O., PENNSYLVANIA.

IMPROVEMENT IN CEMENTS FOR ROOFING.

Specification forming part of Letters Patent No. 24,072, dated May 17, 1859.

*To all whom it may concern:*

Be it known that I, J. CARPENTER WORTH, of Colerain P. O., county of Lancaster, and State of Pennsylvania, have invented a new and Improved Composition for Roofing Houses; and I do hereby declare that the following is a full and exact description of the ingredients which I have discovered and combined for the purpose.

The object of my improvement is to make the composition more durable than the compositions now in use for the purpose of roofing, which I attain by the use of petroleum, (in the place of alcohol or turpentine,) which does not evaporate, and likewise by the use of mineral instead of vegetable substances, which are better security against fire. I heat the petroleum and in it dissolve india-rubber and sandarac. I also heat the coal-tar to about 212° Fahrenheit and to it add the red lead and massicot, and mix therewith the gypsum or plaster-of-paris. The whole composition is laid on the roof and fine sharp washed sand is heavily sprinkled over and upon it.

In mixing I use the following proportions: to one gallon of coal-tar, one quart petroleum, four ounces india-rubber, four ounces sandarac, four ounces red lead, three ounces massicot, and five ounces calcined plaster-of-paris.

What I claim as my invention and discovery, and desire to secure by Letters Patent, is—

Composition for roofing, made up in the manner and of the ingredients proportioned and mixed as herein set forth.

J. CARPR. WORTH.

Witnesses:
J. FRANKLIN REIGART,
M. CARPENTER.